Oct. 19, 1926.
E. G. SIMPSON
1,604,103
WINDSHIELD
Filed Jan. 17, 1924   3 Sheets-Sheet 3
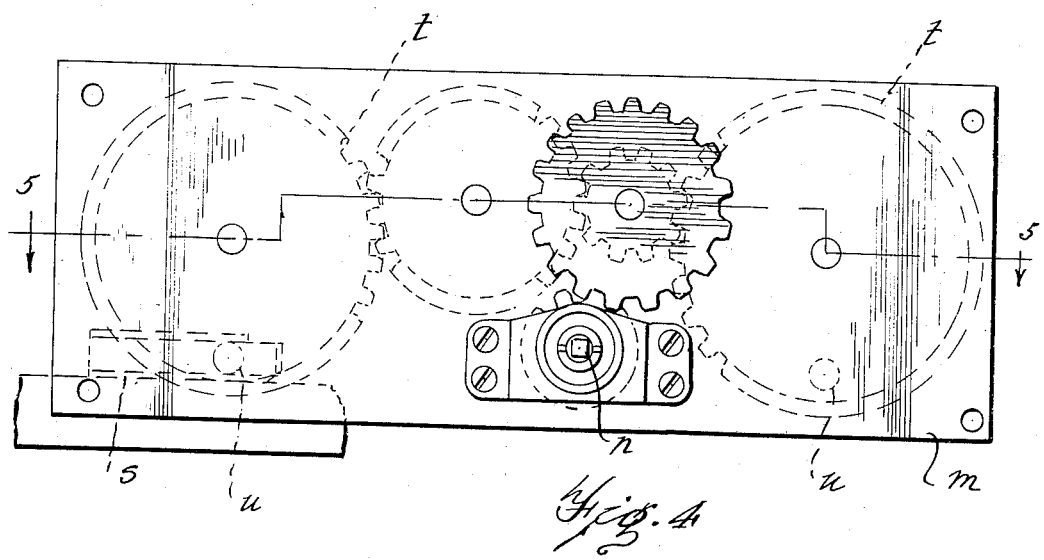
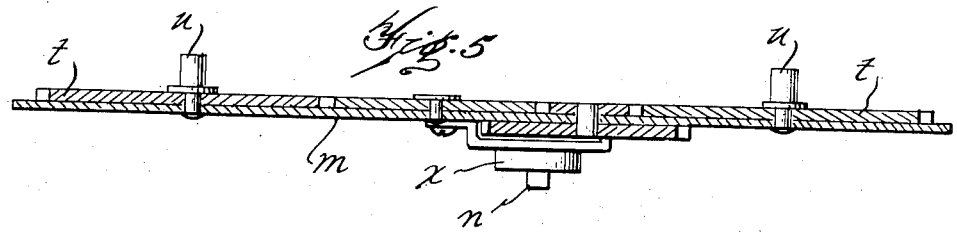
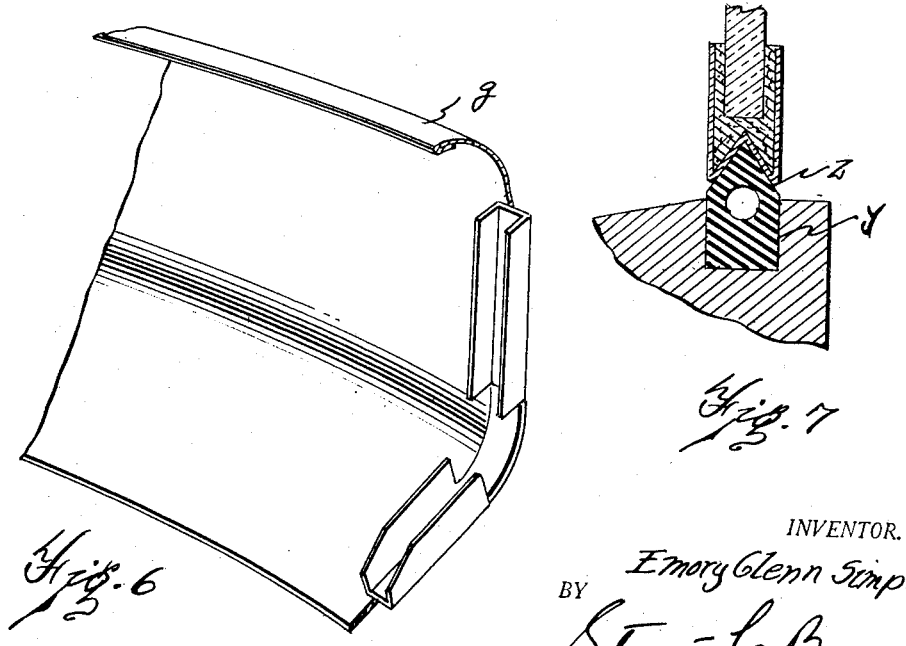
INVENTOR.
Emory Glenn Simpson
BY
Stuart C Barnes
ATTORNEY.

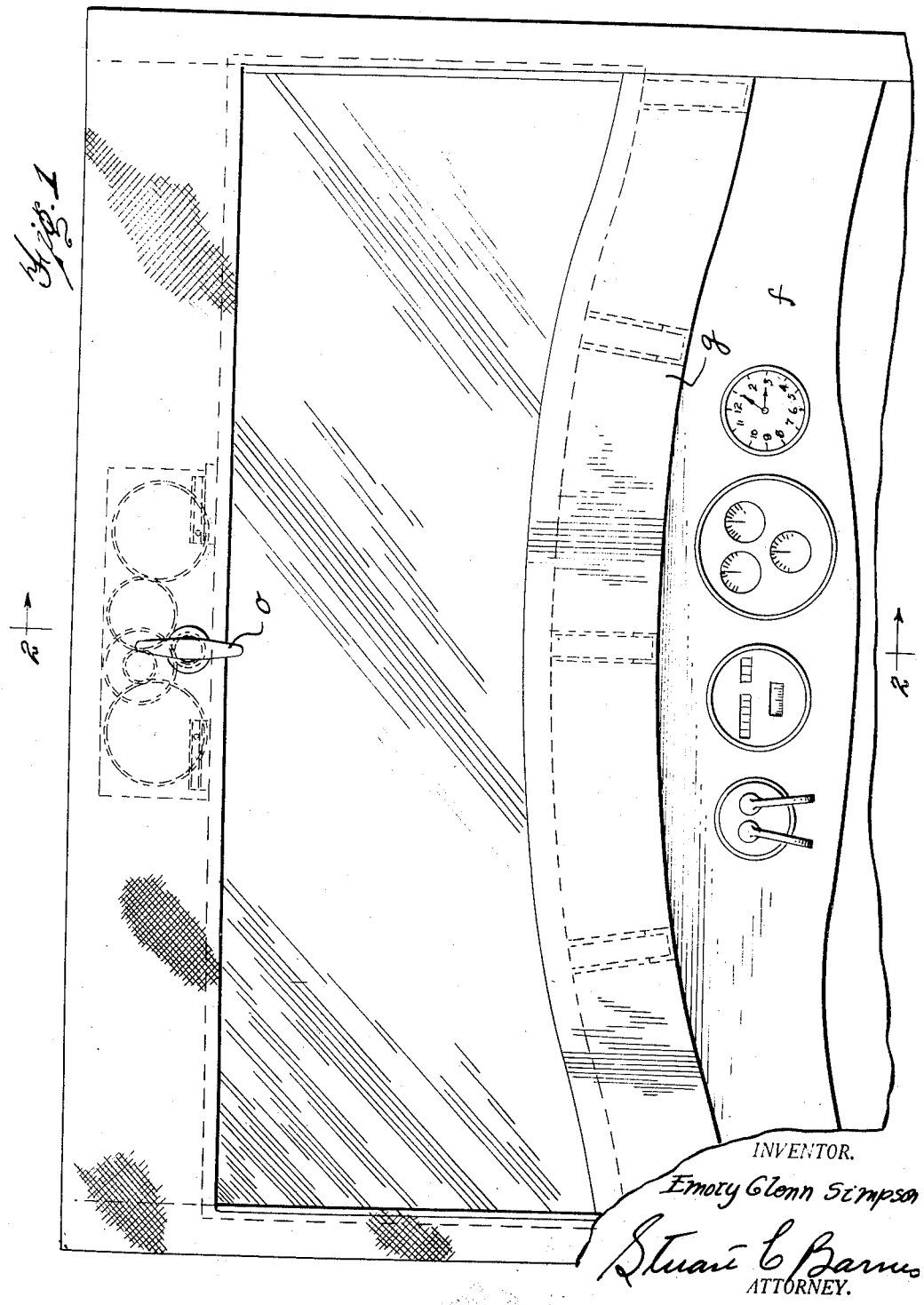

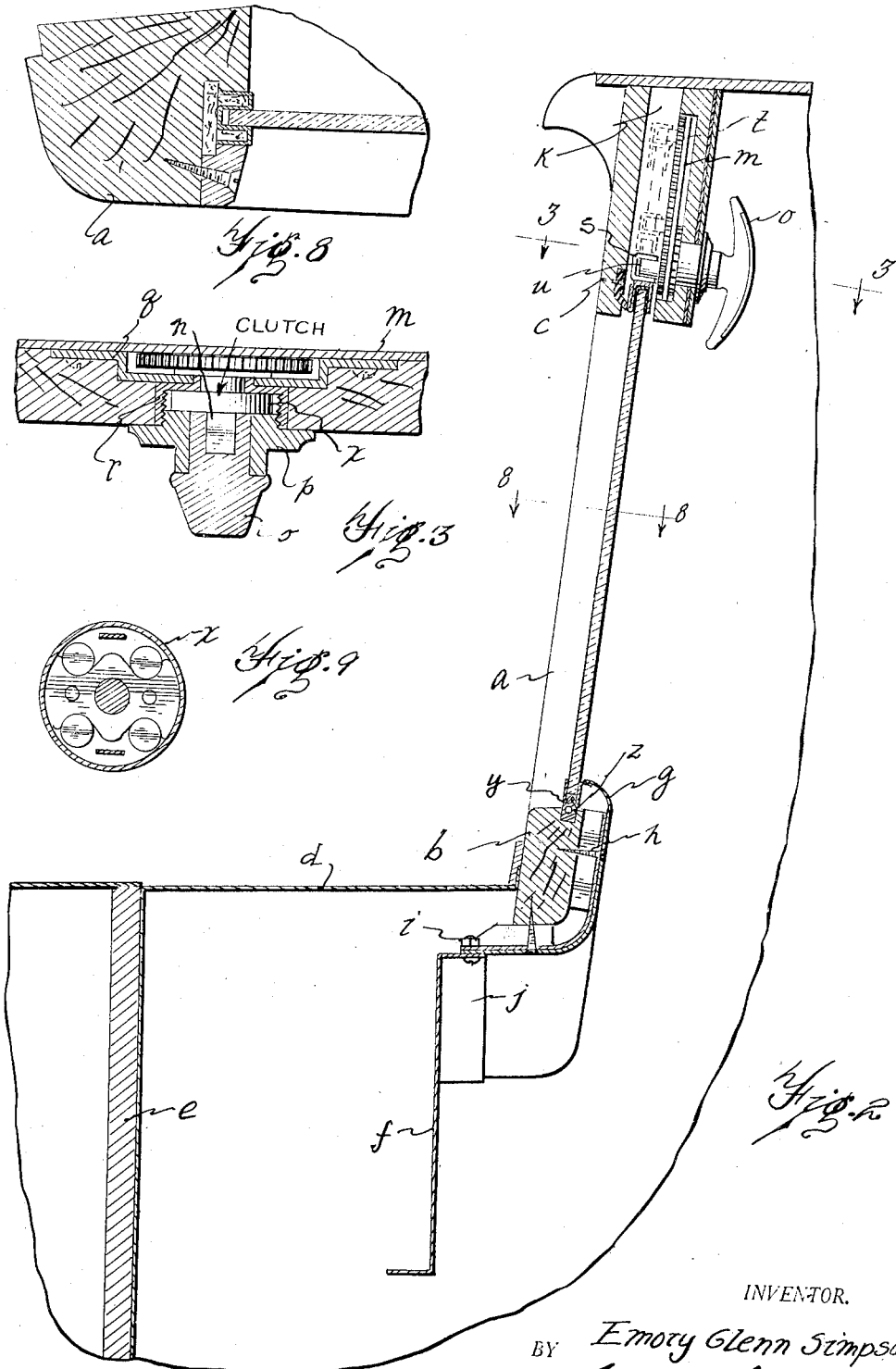

Patented Oct. 19, 1926.

1,604,103

UNITED STATES PATENT OFFICE.

EMORY GLENN SIMPSON, OF DETROIT, MICHIGAN, ASSIGNOR TO FISHER BODY CORPORATION, OF DETROIT, MICHIGAN, A CORPORATION OF NEW YORK.

WINDSHIELD.

Application filed January 17, 1924. Serial No. 686,716.

This invention relates to wind shield construction and has for its object a windshield in which a single panel is raised and lowered by means of a window regulator.

This single panel is so coupled up with a ventilating conduit around the instrument board that the first upward movement of the windshield panel serves to open up this ventilating conduit for indirect ventilation. These features and their connection with the prior art will be described more in detail hereinafter.

In the drawings:

Fig. 1 is a fragmentary elevation of the inside of my improved windshield and the instrument board.

Fig. 2 is a section taken on the line 2—2 of Fig. 1.

Fig. 3 is a section taken on the line 3—3 of Fig. 2.

Fig. 4 is a front elevation of the windshield regulator.

Fig. 5 is a section on the line 5—5 of Fig. 4.

Fig. 6 is a fragmentary perspective of the ventilating conduit wall.

Fig. 7 is a detail of the lower sash bar and rubber fence.

Fig. 8 is a section on the line 8—8 of Fig. 2.

Fig. 9 is a detail of the clutch herein used.

$a$ designates the windshield pillar, $b$, the windshield sill, $c$ the windshield header, $d$, the cowl, $e$, the dashboard, $f$ the instrument board of the car. Ordinarily the windshield sill contains a tapered metal fence on which the lower panel of the windshield seats by means of a tapered groove in the bottom of a metal windshield channel. The swinging lower panel can be lifted off this fence and then swung on a pivot. This constrction is shown and described in the Allmand Patent No. 1,147,836, July 27, 1915. In a high grade job this wooden windshield sill is ordinarily covered by means of a leather-cloth packing. In place of this packing I provide a trough-like metal strip $g$ which is secured to the inside of the sill strip by means of screws $h$ passing through the channelled spacing strips shown in detail in Fig. 6. These spacing strips have the channel side walls cut away where they are bent over to run from the inside of the sill to the underside of the sill. The trough-like strip $g$, together with the spacing channels are bolted by the bolts $i$ to the turned in flange $j$ of the instrument board $f$ or the instrument board and trough can be stamped in one piece.

Now turning to Fig. 2 which is an inside elevation of the windshield, it will be seen that the trough-like ventilator extends the entire length of the shield. The header is provided with a window pocket $k$ and on the inside of the wall of the pocket is located a windshield regulator comprising a plate $m$ provided with a regulator spindle $n$ on the end of which is adapted to be fitted the crank handle $o$ of the regulator. This is located in the middle of the header above the shield where it can be easily grasped by the operator of the car. This crank handle extends an equal distance on either side of the spindle and has its ends turned in. The handle hub is cast or spun onto an escutcheon $p$ (Fig. 3) and the escutcheon is screwed into the interiorally threaded thimble $r$ anchored in the bracket $q$ which is secured by screws to the regulator plate $m$. On the face and back of this regulator plate are secured gears in a train with two large driven gears $t$ on the ends. These driven gears are provided with crank pins $u$, which engage in the channel strips $s$ welded to the top sash bar of the windshield. Within the clutch case $x$ is included a suitable clutch (not shown in detail) such a clutch, for instance, as shown in the Simpson-Cartsen-Smith Patent No. 1,343,410, June 15, 1920, or any other suitable form of clutch.

The bottom of the panel is preferably provided with a light sash channel, for with the sides of the glass sashless, it is desirable to have some rigid member to support the glass from end to end and prevent breakage. I therefore employ a channel bar of light material which is provided with an inverted V like groove. A packing of cork is provided between the channel bar and the panel edge. This V groove is adapted to fit over a collapsible rubber strip $z$ which is fitted into the socket $y$ in the sill. This collapsible rubber strip forms a tapered rubber fence over which the V like groove in the bottom of the sash may fit in a weather-tight fit.

The header permits the windshield to be raised in this particular job about three inches or more. This raising and lowering may be effected by turning the crank handle o. The clutch will automatically lock the regulator in any position for it is one of those clutches which is free to turn when actuation is through the handle but which locks when actuation comes from the window. The windshield panel is lifted at two fairly widely separated points, consequently the difficulty from clamping which might otherwise result is avoided. The first half of travel of the windshield panel serves to uncover the opening in the trough-like ventilator conduit. This opening faces directly forward and the windshield panel acts as a valve or closure for this opening. The operator of the car may raise this shield slightly without getting any direct draft from the shield, which, however, serves to very thoroughly indirectly ventilate the main compartment and cool the foot space below the cowl by means of the ventilator which turns the current of incoming air around the instrument board before it is let out into the main compartment. This eliminates the necessity of the now common ventilator on the cowl and it has a capacity for handling more incoming air than the average cowl ventilator. The windshield panel may be raised still two and a half inches higher by the window regulator or it may be raised to any intermediate position giving a direct draft on the driver, which may be desirable in hot weather.

The header window regulator is not claimed in the present application but in a copending application Serial No. 702,753.

What I claim is:

1. In a windshield, the combination of a pair of windshield pillars, a windshield sill connecting the pillars at the bottom, a header connecting the pillars at the top and provided with a relatively deep upwardly extending panel pocket, and a single upwardly and downwardly sliding windshield panel slidable upwardly and downwardly in a rectilinear path in the plane of the panel and adapted partially to withdraw into the pocket and seating on the sill when the panel is closed to completely fill the space enclosed by the pillars, sill and header.

2. In a windshield for automobile bodies and similar purposes, the combination with a pair of windshield pillars, of a header connecting the pillars at the top and provided with a relatively deep pocket, a sill connecting the pillars at the bottom, a single panel enclosing the space defined by said members when the panel is in its lower position and slidable up and down in said pillars to withdraw partially into said header pocket and ventilate the car over the sill, and a window regulator for raising and lowering said panel.

3. In a windshield for automobile bodies and similar purposes, the combination with a pair of windshield pillars, of a header connecting the pillars at the top and provided with a relatively deep pocket, a sill connecting the pillars at the bottom, a single panel enclosing the space defined by said members when the panel is in its lower position and slidable up and down in said pillars to withdraw partially into said header pocket and ventilate the car over the sill, and a window regulator for raising and lowering said panel, said regulator located in the header pocket and having an operating handle projecting through the header board.

4. In a windshield, the combination of a pair of windshield pillars, provided with upright window ways, a sill connecting the bases of the pillars, a header connecting the tops of the pillars and provided with a panel pocket, a single windshield panel having its lower edge seating in the sill when closed and arranged to withdraw partially into the pocket when raised, window regulator supported in the header for raising and lowering the panel and locking it in intermediate positions and a ventilating conduit whose opening is controlled by the lower portion of the panel and by the operation of the regulator.

5. In a windshield, the combination of a pair of windshield pillars, a windshield panel movable between said pillars from an open to a closed position, a windshield sill connecting the pillars at the bottom, a foot ventilating conduit located at said sill and having a forwardly opening intake port extending above the sill, the said windshield panel being movable in a space forwardly of the ventilating conduit to act as a valve therefor, and a window regulator for operating said movable windshield panel and consequently for controlling the amount of air entering said ventilating conduit.

6. In a windshield, the combination of a movable vehicle having a pair of windshield pillars, a sill connecting the bases of the pillars, a panel slidable up and down in the pillars, a trough-like ventilating conduit supported along the inside of the sill and having its mouth opening forwardly, extending substantially the entire length of the panel, and controlled for the entry of air by the raising and lowering of said panel, said ventilating conduit discharging its air downwardly as a foot ventilator.

7. In a windshield, the combination of a pair of windshield pillars, a sill connecting their bases, an instrument board supported below the sill, a ventilator leading around the inside of the sill and including means for directing air into the body of the ventilator passage and said ventilator discharging on the forward side of the instrument board, a panel slidable up and down in said pillars and serving as a valve to regulate the amount of air deflected into said ventilating conduit, and means for fixing the vertical adjustment of the panel and thereby regulating the ventilating opening.

8. In a windshield, the combination of a pair of windshield pillars, a sill connecting the same at their bases, an instrument board supported below the sill in spaced relation, a trough-like ventilating conduit member supported in spaced relation with respect to the side and bottom of the sill and having its lower end discharging to the front of the instrument board and its upper end directed toward the forward end of the car, and a windshield panel slidable up and down in said posts and acting as a valve to regulate the opening into the ventilating conduit formed by the trough member and sill.

9. In a windshield, the combination of a pair of windshield pillars, a sill connecting them at the bottom, a header connecting the pillars at the top and provided with an upwardly extending panel pocket, and a single panel completely filling (when closed) the windshield opening formed by the pillars, the sill and the header, the said panel slidable upwardly and downwardly in a straight rectilinear path in said pillars and seating on the sill when closed, the said panel arranged to partially withdraw into the pocket to provide ventilation to the interior of the car over the sill.

10. In a windshield, the combination of a pair of windshield pillars, a sill connecting them at the bottom, a header connecting the pillars at the top and provided with an upwardly extending panel pocket, a single panel completely filling (when closed) the windshield opening formed by the pillars, sill and header, the said panel slidable upwardly and downwardly in a straight rectilinear path in said pillars and seating on the sill when closed, the said panel arranged to partially withdraw into the pocket to provide ventilation to the interior of the car over the sill, and means for positively locking the said panel in various raised positions to govern ventilation of the car at the sill.

11. In a windshield, the combination of a pair of windshield pillars, a sill connecting them at the bottom, a header connecting the pillars at the top and provided with a panel pocket, a single panel completely filling the windshield opening formed by the pillars, the sill and the header, the said panel slidable upwardly and downwardly in said pillars and seating on the sill when closed, the said panel arranged to partially withdraw into the pocket to provide ventilation to the interior of the car over the sill, and a window regulator for raising and lowering the said panel and locking the same in intermediate positions.

12. In a windshield, the combination of a pair of windshield pillars, a sill connecting them at the bottom, a header connecting the pillars at the top and provided with a panel pocket, a single panel slidable up and down and entirely closing the windshield opening defined by the pillars, header and sill when seated on the latter, and a ventilator conduit having a forwardly facing opening in the sill and arranged to direct air to a specified portion of the car, said panel arranged to partially withdraw into the pocket varying distances to first let air into the ventilator conduit and when raised further to let air both directly into the car over the sill and indirectly through the ventilating conduit.

13. In a windshield, the combination of a pair of windshield pillars, a sill connecting them at the bottom, a header connecting the pillars at the top and provided with a panel pocket, a single panel slidable up and down and entirely closing the windshield opening defined by the pillars, header and sill when seated on the latter, a ventilator conduit having a forwardly facing opening in the sill and arranged to direct air to a specified portion of the car, said panel arranged to partially withdraw into the pocket varying distances to first let air into the ventilator conduit and when raised further to let air both directly into the car over the sill and indirectly through the ventilating conduit, and means for positively locking said panel in various positions in its up and down movement.

14. In a windshield, the combination of a pair of windshield pillars, a sill connecting them at the bottom, a header connecting the pillars at the top and provided with a panel pocket, a single panel slidable upward and downward and entirely closing the windshield opening defined by the pillars, header and sill when seated on the latter, a ventilator conduit having a forwardly facing opening in the sill and arranged to direct air to a specified portion of the car, said panel arranged to partially withdraw into the pocket varying distances to first let air into the ventilator conduit and when raised further to let air both directly into the car over the sill and indirectly through the ventilating conduit, and a regulator for raising and lowering the panel and locking it in its several positions.

15. In a windshield, the combination of a pair of windshield pillars, a sill connecting the pillars at their bases, a windshield panel having its lower edge seating on the sill and arranged to raise and lower by sliding in said pillars, and a ventilating conduit having its intake opening at the sill and arranged to deliver the forced draft generated by the motion of the vehicle at a specified location in the car, the said sliding panel being arranged to control the ventilating conduit by acting as a valve over the opening therein.

16. In a windshield, the combination of a pair of windshield pillars, a sill connecting the pillars at their bases, a windshield panel having its lower edge seating on the sill and arranged to raise and lower by sliding in said pillars, a ventilating conduit having its intake opening forwardly at the sill and arranged to deliver the forced draft generated by the motion of the vehicle at a specified location in the car, the said sliding panel being arranged to control the ventilating conduit by acting as a valve over the opening therein, and means for positively locking the panel in the various positions of its vertical movement to control the forced draft through the ventilating conduit.

17. In a windshield, the combination of a pair of windshield pillars, a sill connecting the pillars at their bases, a windshield panel having its lower edge seating on the sill and arranged to raise and lower by sliding in said pillars, a ventilating conduit having its intake opening forwardly at the sill and arranged to deliver the forced draft generated by the motion of the vehicle at a specified location in the car, the said sliding panel being arranged to control the ventilating conduit by acting as a valve over the opening therein, and a window regulator for raising and lowering the panel and controlling the forced draft through the ventilating conduit by locking the panel in the various positions of its movement.

18. In a windshield, the combination of a pair of windshield pillars, a sill connecting them at the bottom of the pillars, an upwardly and downwardly sliding panel guided in the pillars and seating on the sill when closed, and a conduit for foot ventilation in the car opening forwardly at the sill, the said panel arranged to raise and lower across the mouth of the ventilating conduit to control the forced ventilation therethrough and also to raise and lower a limited amount above the conduit to control the direct forced draft into the car.

19. In a windshield, the combination of a pair of windshield pillars, a sill connecting them at the bottom of the pillars, an upwardly and downwardly sliding panel guided in the pillars and seating on the sill when closed, a conduit for foot ventilation in the car opening forwardly at the sill, the said panel arranged to raise and lower across the mouth of the ventilating conduit to control the forced ventilation therethrough and also to raise and lower a limited amount above the conduit to control the direct forced draft into the car, and means for positively locking the panel in various positions of its travel to control both the forced draft through the ventilator and the direct forced ventilation.

20. In a windshield, the combination of a pair of windshield pillars, a sill connecting them at the bottom of the pillars, an upwardly and downwardly sliding panel carried on the pillars and seating on the sill when closed, a conduit for foot ventilation in the car opening forwardly at the sill, the said panel arranged to raise and lower across the mouth of the ventilating conduit to control the forced ventilation therethrough and also to raise and lower a limited amount above the conduit to control the direct forced draft into the car, and a window regulator for raising and lowering the panel and positively locking it in various positions of its travel to control both the indirect forced draft through the ventilator and the direct forced draft above the ventilator.

In testimony whereof I affix my signature.

EMORY GLENN SIMPSON.